US007900989B2

(12) United States Patent
Edwards

(10) Patent No.: US 7,900,989 B2
(45) Date of Patent: Mar. 8, 2011

(54) SYSTEM FOR STORING A SPARE TIRE

(75) Inventor: David M. Edwards, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 11/971,208

(22) Filed: Jan. 8, 2008

(65) Prior Publication Data
US 2009/0173759 A1 Jul. 9, 2009

(51) Int. Cl.
*B62D 43/10* (2006.01)

(52) U.S. Cl. ................................ 296/37.2; 224/42.12

(58) Field of Classification Search .............. 296/37.2, 296/187.05, 187.08; 224/42.12, 42.23, 42.24, 224/42.26
See application file for complete search history.

(56) References Cited

U.S. PATENT DOCUMENTS

| | | | | | |
|---|---|---|---|---|---|
| 2,063,092 | A | * | 12/1936 | Groden | 414/463 |
| 2,091,071 | A | * | 8/1937 | Girl | 414/466 |
| 2,146,107 | A | * | 2/1939 | Biszantz | 296/37.2 |
| 2,175,769 | A | * | 10/1939 | Biszantz | 298/1 R |
| 2,547,083 | A | | 4/1951 | Lundgren | |
| 2,661,131 | A | * | 12/1953 | Roy | 224/42.26 |
| D179,516 | S | * | 1/1957 | Kammeyer | D12/202 |
| 3,747,814 | A | | 7/1973 | Briery | |
| RE29,348 | E | | 8/1977 | Bott | |
| 4,106,681 | A | * | 8/1978 | Bott | 224/42.12 |
| 4,418,852 | A | * | 12/1983 | Grinwald | 224/42.23 |
| 4,498,614 | A | * | 2/1985 | Guarr | 224/42.13 |
| 5,429,285 | A | * | 7/1995 | Kim | 224/42.14 |
| 5,586,698 | A | | 12/1996 | Satoh | |
| 5,941,432 | A | * | 8/1999 | Spencer et al. | 224/42.13 |
| 5,951,232 | A | | 9/1999 | Yu et al. | |
| 6,026,999 | A | | 2/2000 | Wakefield | |
| 6,155,323 | A | * | 12/2000 | Gougelet | 157/1 |
| 6,336,671 | B1 | * | 1/2002 | Leonardi | 296/37.3 |
| 6,672,639 | B2 | | 1/2004 | Kosuge et al. | |
| 7,036,697 | B2 | * | 5/2006 | Hwang et al. | 224/42.14 |
| 7,410,081 | B2 | * | 8/2008 | McClure et al. | 224/403 |
| 2005/0056667 | A1 | | 3/2005 | McClure et al. | |
| 2006/0017301 | A1 | | 1/2006 | Edwards | |

FOREIGN PATENT DOCUMENTS

| | | |
|---|---|---|
| EP | 0 064 925 | 8/1985 |
| JP | 2000-142484 | 5/2000 |
| WO | WO 2005/014374 | 2/2005 |

* cited by examiner

*Primary Examiner* — Jason S Morrow
(74) *Attorney, Agent, or Firm* — Mark E. Duell; Rankin Hill & Clark LLP

(57) ABSTRACT

A system for storing a spare tire within a vehicle includes a support surface, a rear tire brace, and a front restraint member. The support surface supports the spare tire. The support surface has a rearward portion on which a rearward radial portion of the spare tire is supported and a forward portion on which a forward radial portion of the spare tire is supported. The rear tire brace is spaced apart from the rearward portion of the support surface for limiting lifting movement of the rearward radial portion of the spare tire. The front restraint member is removably secured to the forward portion of the support surface for limiting at least one of forward, lateral and lifting movement of the spare tire on the support surface.

18 Claims, 6 Drawing Sheets

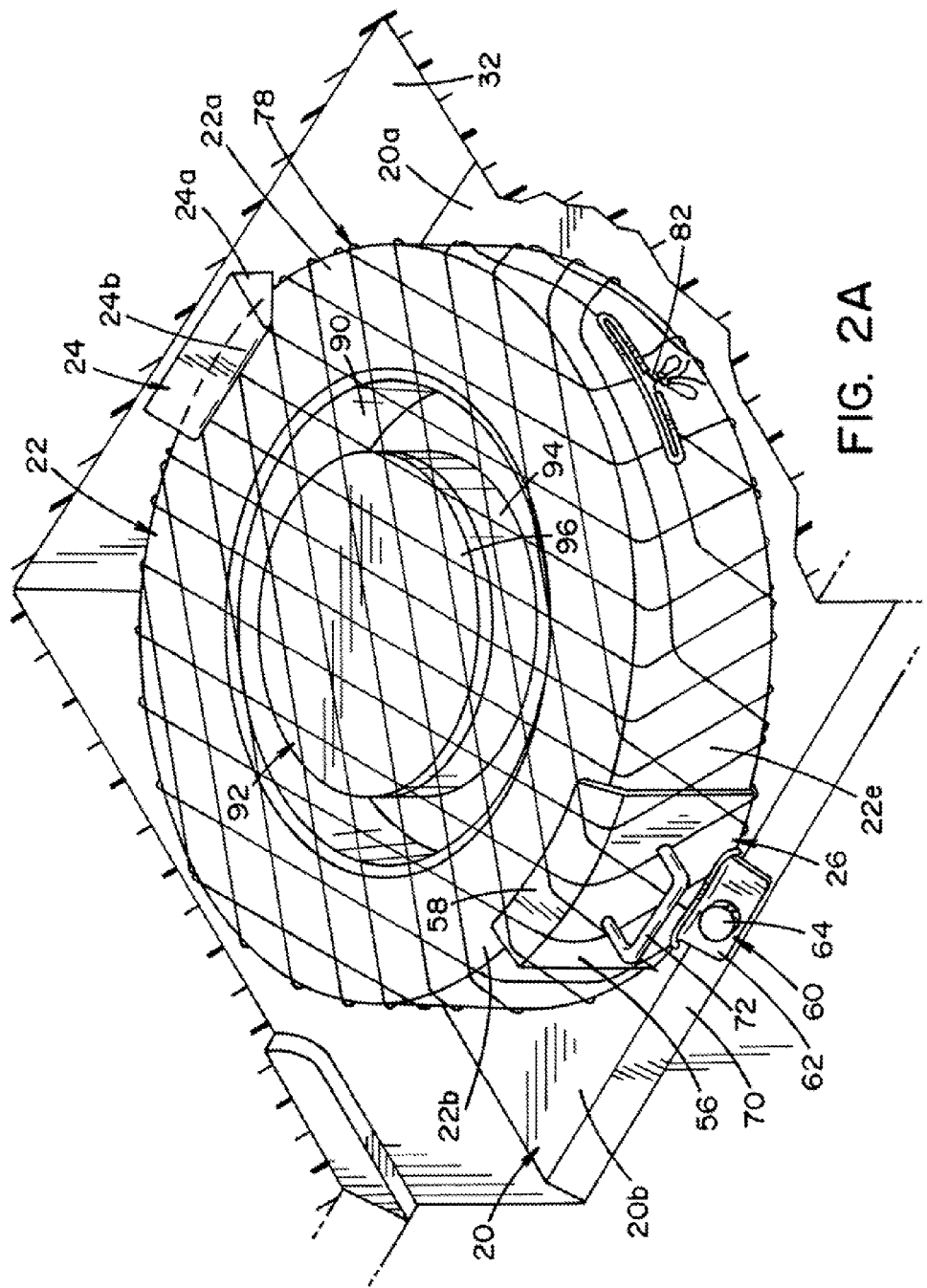

SYSTEM FOR STORING A SPARE TIRE

BACKGROUND

The present disclosure generally relates to an improved system for storing or retaining a spare tire within a vehicle, and more particularly relates to a low cost spare tire storage system that provides easy access to the spare tire. In one embodiment, a retention system for storing a spare tire within a vehicle includes a rear tire brace and a removably secured front restraint member for limiting at least one of forward, lateral, and lifting movement of the spare tire relative to the support surface. The improved spare tire storage system will be described with particular reference to this embodiment, but it is to be appreciated that it is also amenable to other like applications.

U.S. Patent Publication No. 2006/0017301, commonly assigned to Honda Motor Co., Ltd., discloses a storage compartment, which can be provided in the bed floor of a pickup truck-type vehicle. In one embodiment, the storage compartment includes a main chamber for carrying miscellaneous cargo and an auxiliary chamber that is configured to hold a spare tire. In particular, the spare tire can be supported by a tray that is slidably disposed for travel into and out of the auxiliary chamber. When desirable to use the spare tire, the tray within the tire thereon can be slid open into the main chamber and the tire then easily accessed and removed.

BRIEF DESCRIPTION

According to one aspect, a system for storing a spare tire within a vehicle is provided. More particularly, in accordance with this aspect, the system for storing a spare tire within a vehicle includes a support surface for supporting the spare tire. The support surface has a rearward portion on which a rearward radial portion of the spare tire is supported and a forward portion on which a forward radial portion of the spare tire is supported. A rear tire brace is spaced apart from the rearward portion of the support surface for limiting lifting movement of the rearward radial portion of the spare tire. A front restraint member is removably secured to the forward portion of the support surface for limiting at least one of forward, lateral and lifting movement of the spare tire on the support surface.

According to another aspect, a retention system for storing and retaining a spare tire within a vehicle compartment is provided. More particularly, in accordance with this aspect, the retention system for storing and retaining a spare tire within a vehicle compartment includes a support surface, a rear tire brace, and a front restraint member. The support surface of the vehicle compartment supports the spare tire. The rear tire brace is spaced apart from a rearward portion of the support surface. The rear tire brace protrudes into the vehicle compartment to define a tire receiving channel between the support surface and the rear tire brace for receiving a rear radial portion of the spare tire. The front restraint member is removably mounted to the support surface at a location spaced apart from the rear tire brace along the support surface for limiting movement of the spare tire.

According to yet another aspect, a method for storing a spare tire in a vehicle is provided. More particularly, in accordance with this aspect, a spare tire is positioned on a vehicle compartment support surface with a rearward radial portion of the spare tire on a rearward portion of the support surface and a forward radial portion of the spare tire on a forward portion of the support surface. The rearward radial portion of the spare tire is inserted into a receiving channel defined between the rearward portion of the support surface and a rear tire brace. The rear tire brace is spaced apart from the rearward portion of the support surface and apart from the support surface itself. A front restraint is removably secured to the forward portion of the support surface to limit movement of the spare tire.

BRIEF DESCRIPTION OF THE DRAWINGS

FIG. 2A is an enlarged partial perspective view of the retention system for storing a spare tire of FIG. 1.

DETAILED DESCRIPTION

Figure 1:
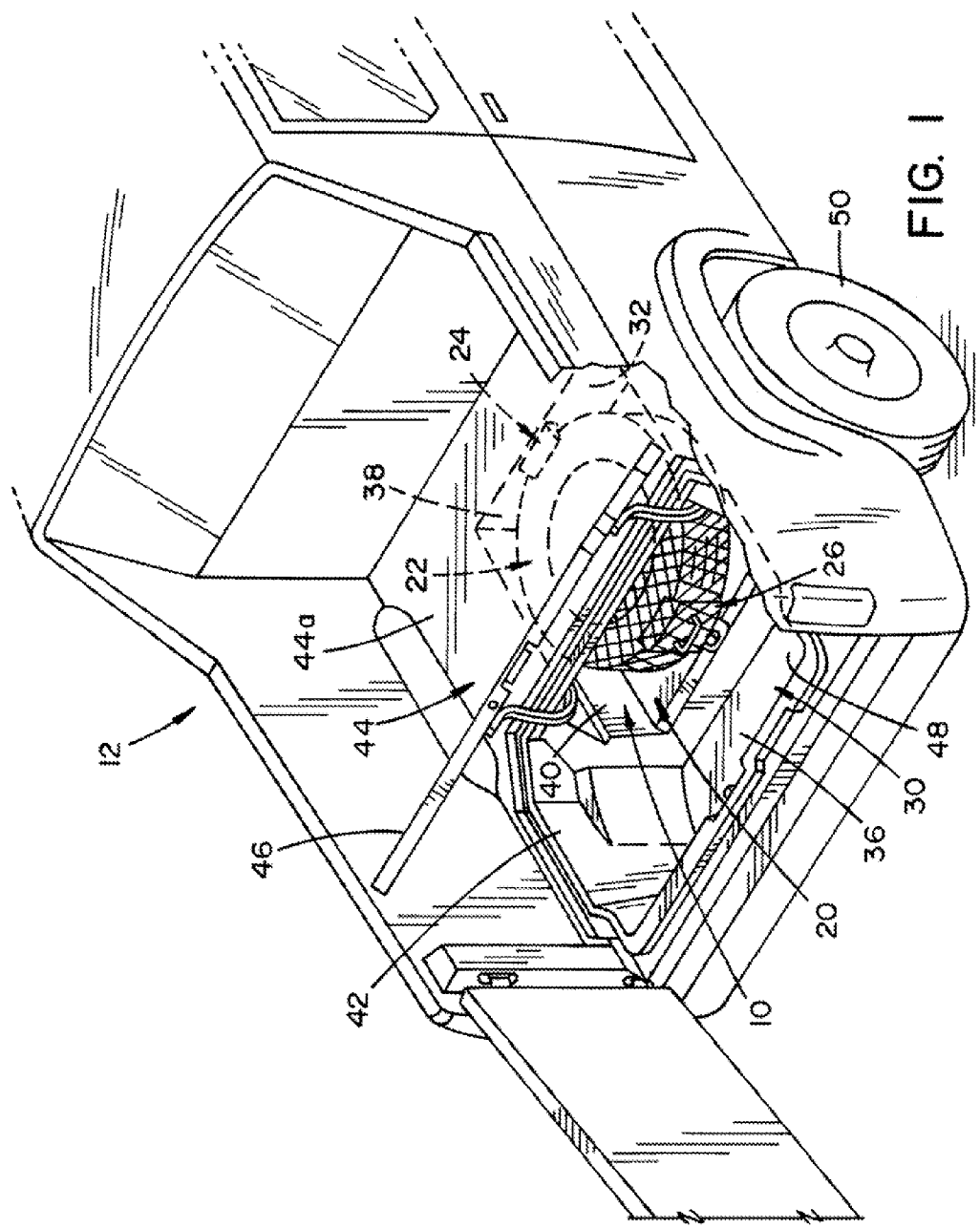
FIG. 1 is a perspective view of a retention system for storing a spare tire within a vehicle showing the retention system integrated into a vehicle having a load-carrying bed and a storage compartment provided beneath a floor of the load carrying bed.

Referring now to the drawings wherein the showings are for purposes of illustrating one or more exemplary embodiments, FIG. 1 shows a retention system for storing and retaining a spare tire within a vehicle that is generally designated by reference numeral 10. In the illustrated embodiment, the system 10 is shown integrated into the vehicle design of vehicle 12. In the illustrated embodiment, the vehicle 12 is shown as a sport utility truck (SUT), but it is to be appreciated by those skilled in the art that the system 10 could be deployed within some other vehicle, including other vehicles having a bed, such as a pickup truck, sport utility, crossover, utility truck or other vehicle, or still other vehicles that do not necessarily include a bed. One purpose of the system 10 is to store and retain a spare tire within a vehicle, such as vehicle 12, and particularly within a vehicle compartment, such as a trunk-type compartment, in a simple and cost effective manner.

Figure 2B:
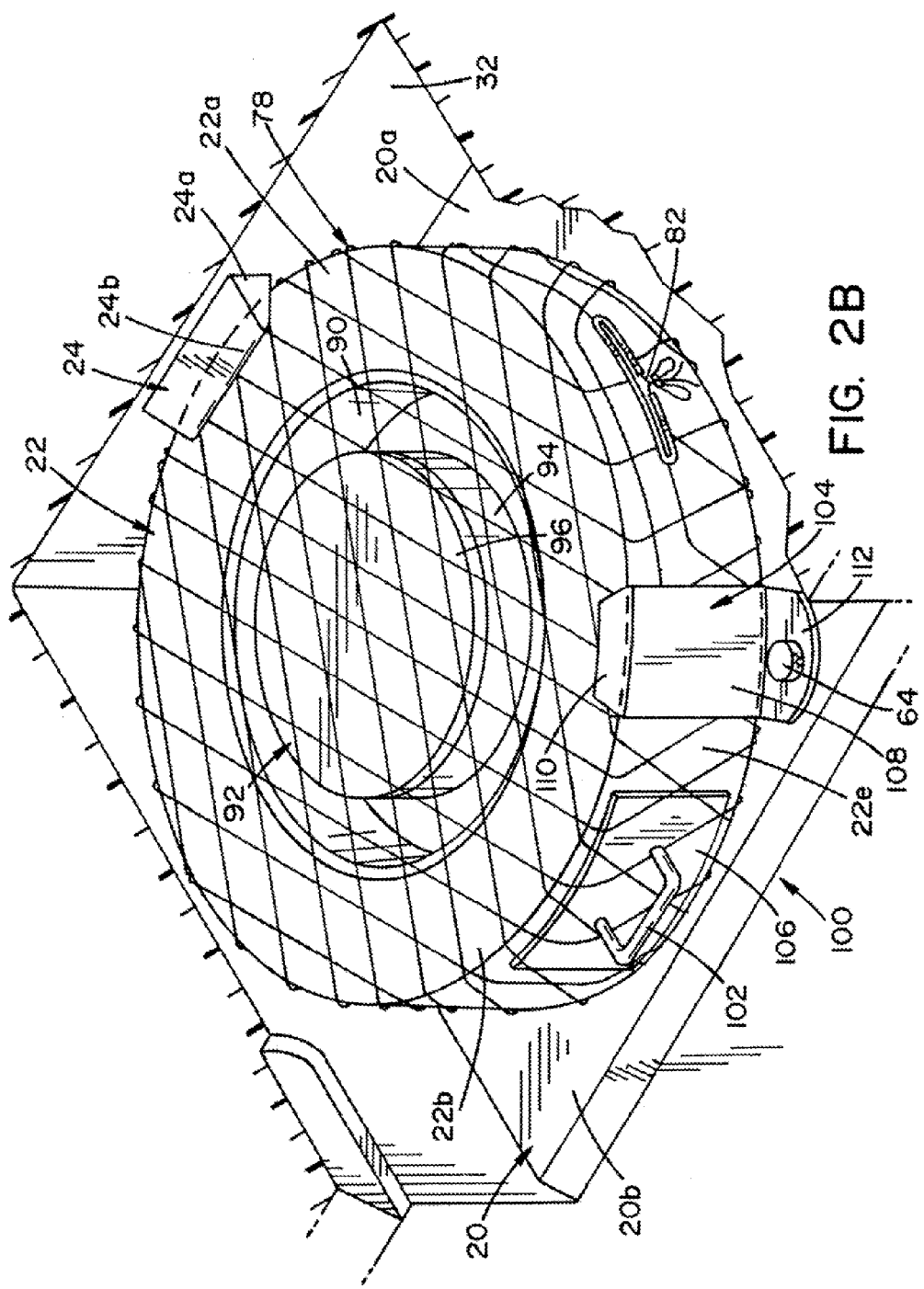
FIG. 2B is an enlarged partial perspective view of an alternate retention system for storing a spare tire.
Figure 3:
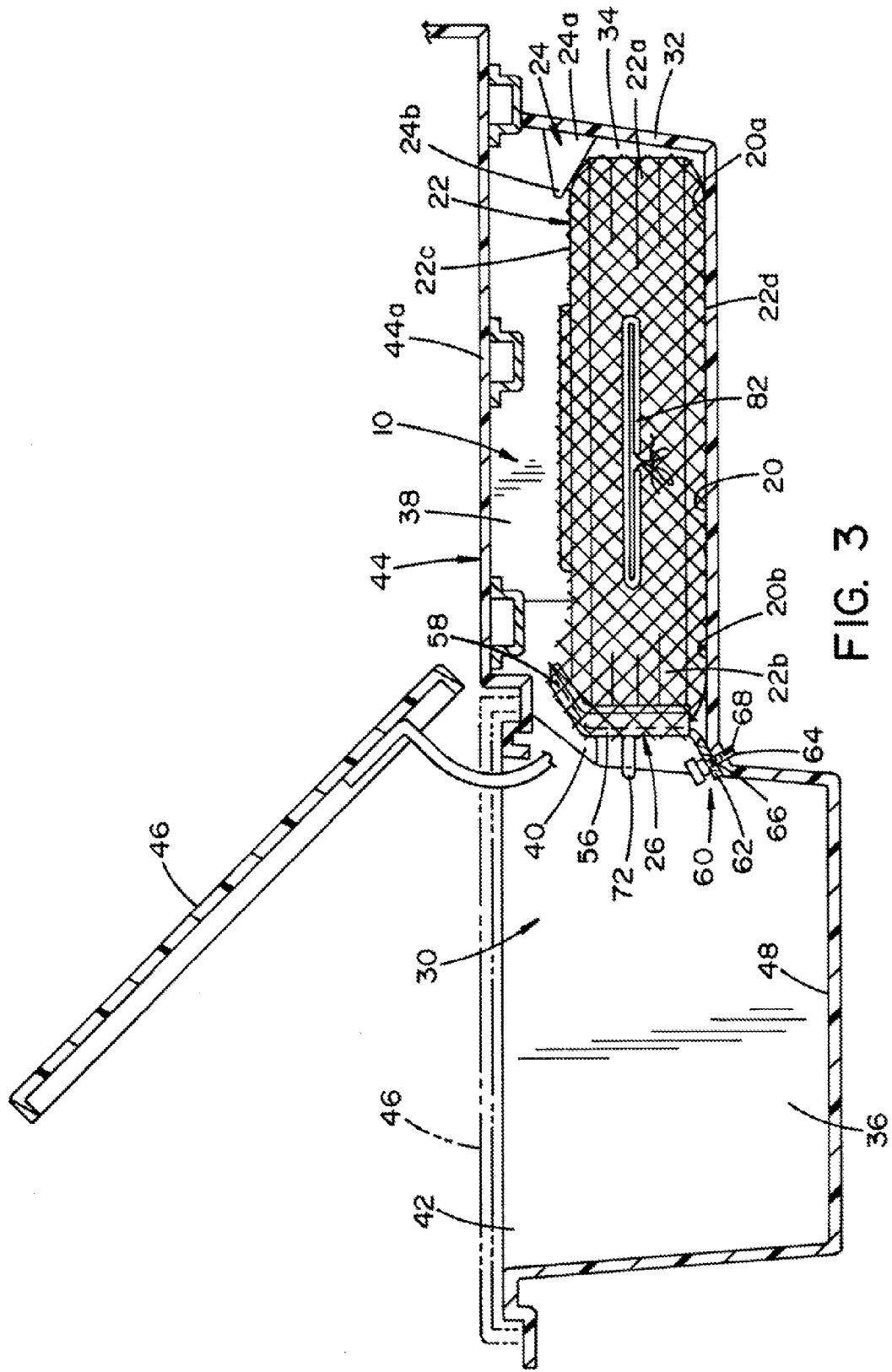
FIG. 3 is a cross-sectional view of the retention system for storing a spare tire of FIG. 1.

With additional reference to FIGS. 2A and 3, the retention system 10 includes a support surface 20 for supporting a spare tire 22. The support surface 20 has a rearward portion 20a on which a rearward radial portion 22a of the spare tire 22 is supported and a forward portion 20b on which a forward radial portion 22b of the spare tire 22 is supported. As shown, the forward and rearward radial portions 22a, 22b of the spare tire 22 are generally diametrically opposed to one another.

The system 10 further includes a rear tire brace 24 and a front restraint member 26. As shown, the rear tire brace 24 can be spaced apart from the rearward portion 20a of the support surface 20 for limiting lifting movement of the spare tire 22, particularly the rearward radial portion 22a thereof. The rear tire brace 24 extends radially along an upper axial side 22c of the spare tire 22. A lower axial side 22d (FIG. 5) of the spare tire 22 rests against the support surface 20. As will be described in more detail below, the front restraint member 26 is removably secured or mounted to the support surface 20, and particularly to the forward portion 20b of the support surface 20, for limiting movement of the spare tire (e.g., at least one of forward, lateral and lifting of the spare tire), particularly relative to the support surface 20. More specifically, the front restraint member 26 is removably secured or mounted to the support surface 20 at a location (i.e., the forward portion 20b) that is spaced apart from the rear tire brace 24 along the support surface 20.

As shown, the support surface 20 can define or be part of a vehicle compartment 30. The compartment 30 and thus the system 10 can additionally include a rear wall 32 extending upward from the support surface 20, particularly from the rearward portion 20a of the support surface, along the rear radial portion 22a of the spare tire 22. Within the compartment 30, the support surface 20 can be generally horizontal and extends along the lower axial side 22d of the spare tire 22. The rear wall 32 extends upwardly from the support surface 20 a distance greater than a thickness of the spare tire 22.

The rear tire brace 24 extends from the rear wall 32 and, as already mentioned, extends along at least a portion of the upper axial side 22c of the spare tire 22. The rear tire brake 24 can be fixed to the rear wall 32, formed integrally therewith or removably secured to the rear wall 32, as desired. In particular, the rear tire brace 24 protrudes into the vehicle compartment 30 to define a tire receiving channel 34 between the support surface 20 and the rear tire brace 24 for receiving the rear radial portion 22a of the spare tire 22. The rear tire brace 24 is generally wedge-shaped so as to provide the tire receiving channel 34 with a decreasing height or width along a depth thereof. More specifically, the wedge-shaped rear tire brace 24 has a wider base 24a and a narrower apex portion 24b and thus the tire receiving channel 34 narrows (i.e., has a decreasing height or width) as the tire 22 is inserted therein (i.e., along a depth of the channel 34).

In the illustrated embodiment, the vehicle compartment 30 is a two chamber storage compartment including a main chamber 36 and an auxiliary chamber 38. The main chamber 36 is connected to the auxiliary chamber 38 through an opening 40 of sufficient size to pass the spare tire 22 therethrough. Thus, when not restrained by the front restraint member 26, the spare tire 22 can be removed from the auxiliary chamber 38 by passing the same through the opening 40 and into the main chamber 36. As best shown in FIG. 1, the spare tire 22 can then be easily removed from the main chamber 36 by passing the tire 22 through a main chamber or vehicle compartment opening 42 defined in the bed floor 44 of the vehicle 12, which is selectively closed by closure member or lid 46. In the illustrated embodiment, the closure member 46 can also form at least a portion of the bed floor 44 when in its closed position, closing the opening 42 to the main chamber 36.

The rear wall 32 is or forms the rear wall of the auxiliary chamber 38 and likewise the support surface 20 is or forms the floor of the auxiliary chamber 38. In the illustrated embodiment, the main chamber 36 of the compartment 30 is forwardly disposed relative to the auxiliary chamber 38 and has a main chamber floor 48 disposed at a lower elevation than the support surface of floor 20 of the auxiliary chamber 38. A portion 44a of the bed floor 44 forms a non-movable ceiling wall that is disposed over the auxiliary chamber 38. When secured to the support surface 20, the front restraint 26 prevents movement of the spare tire 22 into the main chamber 36 and thus prevents the spare tire from being removed from the compartment 30. When the front restraint member 26 is removed and the lid or openable closure 46 is in its open position, the spare tire 22 can be removed from the compartment 30, such as would be necessary when substituting the spare tire 22 for one of the tires 50 of the vehicle 12.

In the illustrated embodiment, the ceiling wall 44a and the openable closure 46 form the bed floor 44 of a load carrying bed of the vehicle 12 and the two chamber storage compartment 30 forms a trunk compartment in the bed floor 44 of the vehicle 12. However, it is to be understood and appreciated by those skilled in the art that the retention system 10 of the present disclosure is suitable for applications in other types of vehicles and/or other types of tire storage compartments. Thus, the vehicle in which the system 10 is used need not be a truck having a load-carrying bed and the compartment 30 need not be configured as a two chamber storage compartment disposed in the bed floor of a vehicle (nor does the auxiliary chamber need to be configured exactly as shown). For example, the chamber 38 could be defined by a shelf in the trunk of a passenger or sedan-type vehicle wherein the front restraint 26 would prevent movement of the spare tire 22 into the remainder of the trunk compartment while secured to the support surface 20.

In the illustrated embodiment, the front restraint 26 includes a body portion 56 that, when the front restraint 26 is secured to the support surface 20 (or some other intermediate member or component), extends axially along the front radial portion 22b of the spare tire 22, and specifically along a tread portion 22e of the spare tire 22, to limit forward movement of the spare tire. In the illustrated embodiment, the body portion 56 extends along all or a substantial portion or height of the radial portion 22e of the tire 22. In addition, as shown, the body portion 56 can have a curvature, such as a curvature that generally matches the curvature of the spare tire 22, to better facilitate restraint of the spare tire 22 when the front restraint 26 is secured to the support surface 20 (i.e., the matching curvature can limit or restrict lateral movement of the spare tire). Of course, the body portion 56 could have some other curvature that does not specifically match that of the spare tire 22 or need not have any curvature. At an end opposite the support surface 20, the body portion 56 can include a flange portion 58. In the illustrated embodiment, the body portion 56 is generally orthogonally oriented relative to the support surface and the flange portion 58 is angled relative to the body portion 56 and the support surface 20. The flange portion 58 can further secure the spare tire 22 in its stowed position and, similar to the rear brace 24, the flange portion 58 can effectively limit lifting of the tire 22, particularly the front radial portion 22b thereof, from the support surface 20.

As already mentioned herein, the front restraint member 26 is removably secured to the forward portion 20b of the support surface 20. In the illustrated embodiment, such removable securement of the front restraint member 26 to the support surface 20 is effected by a fastening arrangement 60. The illustrated fastening arrangement 60 includes a flange 62 depending from the body portion 56 at an end thereof opposite the end from which the flange portion 58 is located. In particular, a fastener, such as a threaded bolt member 64, is passed through an aperture 66 defined in the flange 62 and threadedly received in an aperture 68 defined in the support surface 20.

More specifically, in the illustrated embodiment, the support surface 20 includes an angled front portion 70 in which the threaded aperture 68 is defined. The front restraint member 26 can be positioned on the support surface 20 such that the aperture 66 in the lower flange 62 is in registry with the threaded aperture 68 of the front portion 70. While in registry, the fastener 64 can be passed through the aperture 66 and threaded into the aperture 68 to removably secure the front restraint 26 to the support surface 20. As best shown in FIG. 3, the flanges 58, 62 extend from opposite ends of the body portion 56 and in opposite directions relative to one another so as to give the front restraint an S-shaped or reverse Z-shaped profile. For purposes that will become more apparent below, the front restraint member 26, and particularly the body portion 56 thereof, can include an integrally formed handle 72.

As shown, the restraint system 10 can further include a flexible bag 78 in which the spare tire 22 can be disposed, particularly when the spare tire is in its stored condition. As shown in the illustrated embodiment, the flexible bag 78 can be a net bag or similar, although this is not required. The bag 78 enables the spare tire 22 to be movable in a forward transverse direction along the support surface 20 by pulling the bag 78 when the front restraint 26 is removed or unsecured from the forward portion 20b of the support surface 20.

Figure 4:
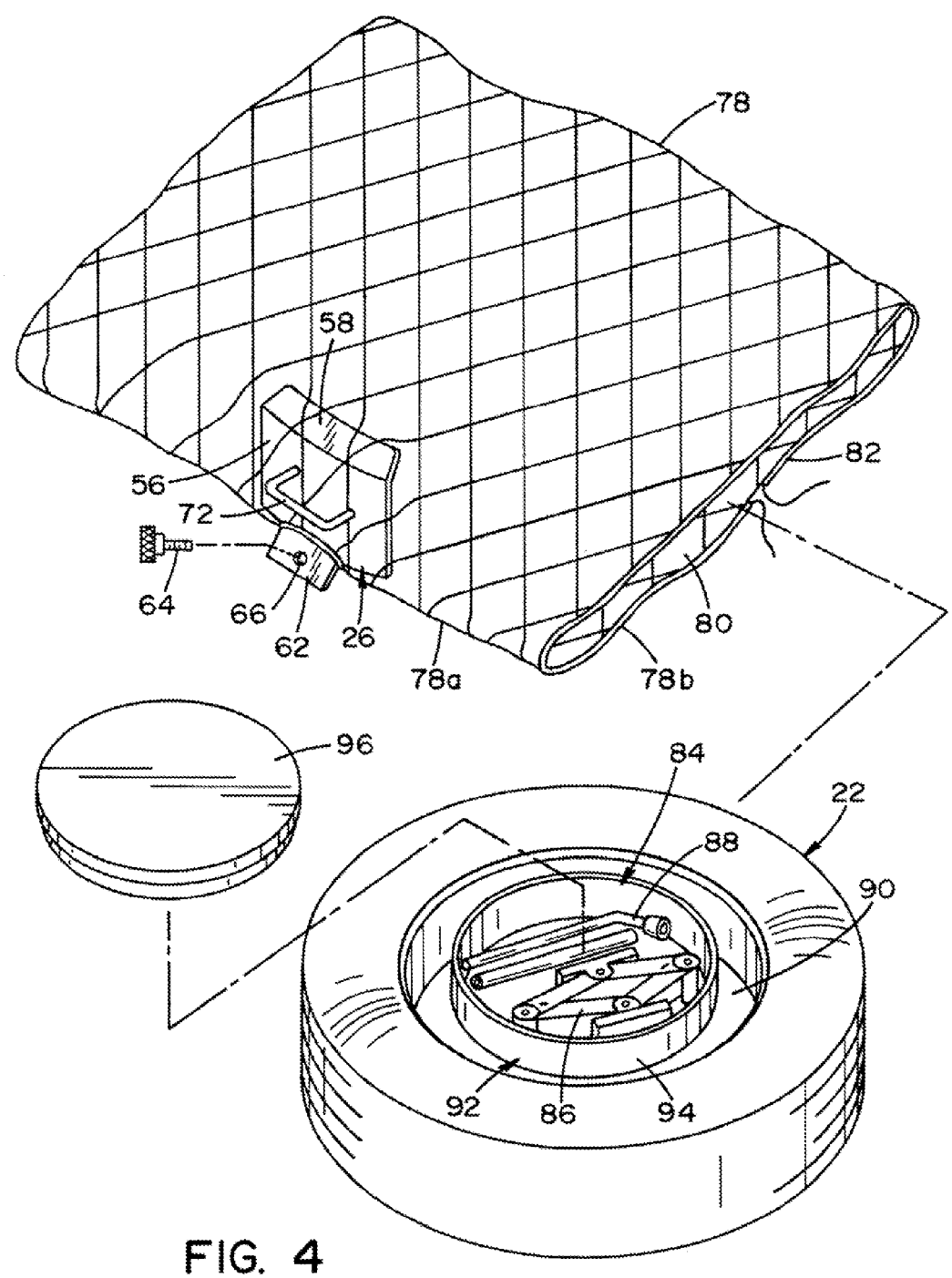
FIG. 4 is an exploded perspective view showing components of the retention system for storing a spare tire of FIG. 1.

With additional reference to FIG. 4, the flexible bag 78 can include an open end 80. A draw string 82 or other closing device (e.g., latch, hook and loop fastener, etc.) can be provided for closing the open end 80, particularly when the spare tire 22 is received in the bag 78. In addition, as shown, the front restraint 26 can be disposed and/or connected to the bag 78 such that the handle 72 of the front restraint 26 is usable to pull the bag 78 when the front restraint 26 is unsecured or removed from the support surface 20.

In the illustrated embodiment, and as best shown in FIG. 4, the front restraint 26 can be positioned within or connected to the bag 78 along a first side 78a thereof and the open end 80 of the bag 78 can be positioned along a second side 78b that is adjacent to the first side 78a. As will be apparent to those skilled in the art, the net bag 78 and the front restraint 26 connected thereto can be used to assist in removing the spare tire 22 from the auxiliary compartment 38 when the spare tire 22 is received in the bag 78 and the bag is closed thereabout. That is, a user can simply pull on the handle 72 of the front restraint 26 (when the front restraint is disconnected from the support surface 20) to pull the spare tire 22 via the bag 78 out of the auxiliary compartment 38 and into the main chamber 36, and in turn out through the opening 42.

With reference to FIG. 2B, an alternate retention system 100 is shown for storing spare tire, wherein like components are identified by like numerals and new components are identified by new numerals. In the system 100, the integral handle and front restraint member 26 of FIG. 2A is replaced by a separate handle 102 and front restraint 104. In the embodiment shown, the handle 102 has a base plate 106 to which bag 78 is connected, though other configurations are contemplated, and are to be considered within the scope of the present disclosure (e.g., a flexible handle could be formed as part of the bag 78, etc.). The handle 102 functions like the handle 72 of FIG. 2A in that it facilitates removal of the tire 22 when the restraint 104 is removed.

The separate restraint member 104 can take on a variety of configurations for limiting or restricting movement of the spare tire 22, but is illustrated as being offset from a longitudinal axis defined by the rear brace 24 and the handle 102 (or the center of the tire 22 opposite the rear brace 24). Like the restraint 26, the restraint 104 is removably secured to the support surface 20 (or some intermediate member or component) to limit or restrict movement in a forward direction, lifting of the tire 22 and movement in a lateral direction (i.e., side-to-side). Also, like restraint 26, the restraint 104 can include a body portion 108 (with or without any curvature), an upper flange portion 110, and a lower flange 112 removably secured by a fastener, such as fastener 64. In most other respects, the restraint 104 functions and operates like the restraint 26.

Figure 5:
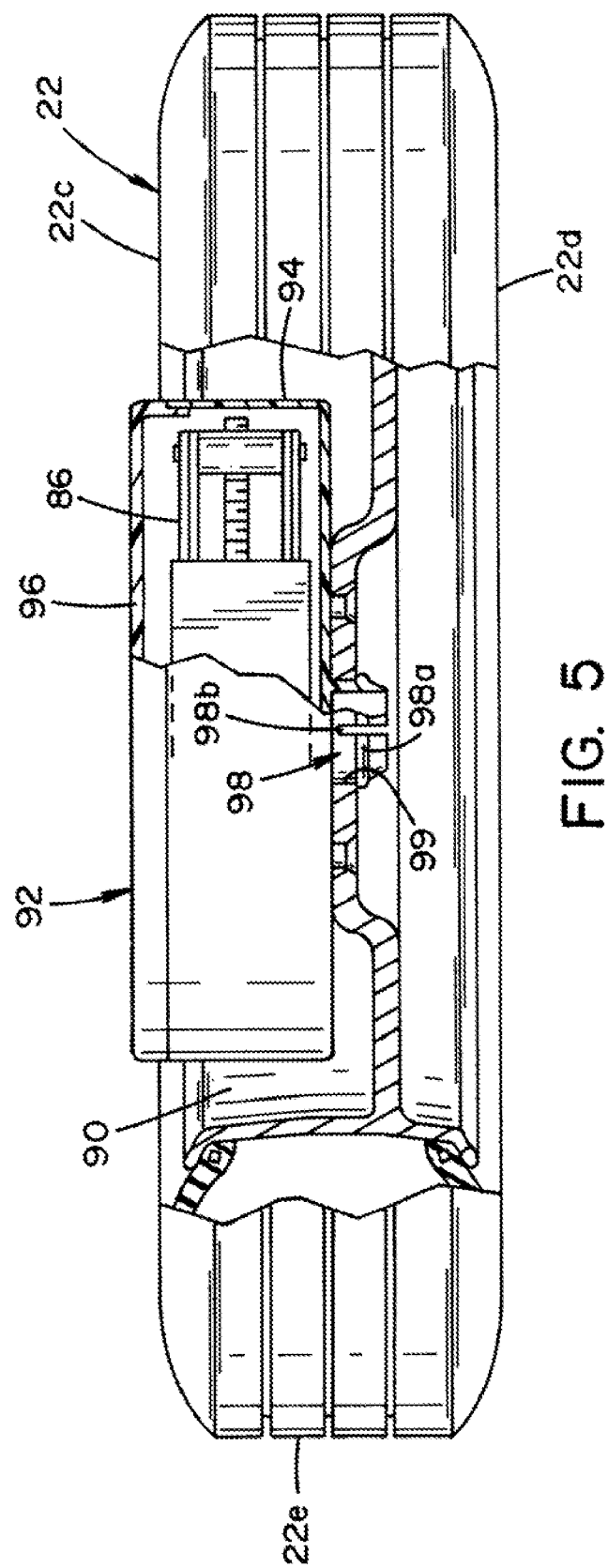
FIG. 5 is an end elevational view of the spare tire of the retention system shown in partial cross-section to illustrate a storage container retained within a central portion of the spare tire for storing tire changing gear or other items.

With reference now to FIG. 5, the restraint system 10 (or 110) can additionally include tire changing gear 84, such as, for example, a jack 86 and a lug wrench 88. The tire changing gear 84 can be disposed within the bag 78 and further disposed within a recessed well portion 90 of the spare tire 22 so that removal of the bag 78 and the spare tire 22 also has the effect of removing the tire changing gear 84. If desired, the tire changing gear 84 can be secured to the spare tire 22 (not shown), such as by a bolt or latching arrangement or some other connection means. Alternately, as shown, a tire changing gear 84 can be contained within a tool accessory container 92 which is itself received within the recessed well portion 90 of the tire 22 (or container 92 can be used for holding other items in addition to or instead of the tire changing gear 84). The container 92 can include a body portion 94 for holding the tire changing gear 84 and a lid 96 for selectively closing the body portion 94.

When employed, the container 92 can simply be nestably received within the recessed well portion 90 and/or can be secured via some type of fastener to the spare tire. For example, as shown, the body portion 94 can include an integral connector portion 98 receivable removably within a hub recess 99 of the wheel 22 and held in place by rib 98a. Slots 98b can be provided to give the connector 98 some resiliency for facilitating insertion and removal within the recess 99. Of course, as will be understood and appreciated by those skilled in the art, other configurations and arrangements are possible, including other devices and/or means for fixing the container 92 to the tire 22 (e.g., a threaded connector). In any case, the tire changing gear 84 being disposed within the recessed well portion 90 or disposed within the container 92 which is itself disposed in the recessed well portion 90 facilitates easier removal of the tire changing gear 84. More specifically, when the handle 72 of the front restraint 26 is pulled to remove the bag 78 and the tire 22 contained therein from the auxiliary chamber 38, the tool changing gear 84 is simultaneously removed. Thus, the system 10 and specifically the bag 78 enable the tire 22 and the tool changing gear 84 to be removed together simultaneously as a unitary object.

As should be apparent to those of skill in the art upon reading the foregoing description, the present disclosure teaches a method for storing a spare tire in a vehicle. More specially, the spare tire 22 can be positioned on the support surface 20 of the vehicle compartment 30. In particular, the spare tire 22 is positioned on the vehicle compartment support surface 20 with a rearward radial portion 22a of the spare tire 22 on a rearward portion 20a of the support surface 20 and a forward radial portion 22b of the spare tire 22 on a forward portion 20b of the support surface 20. When placing the spare tire 22 into the auxiliary chamber 38, the rearward radial portion 22a of the spare tire 22 is inserted into the receiving channel 34 defined between the rearward portion 20a of the support surface 20 and the rear tire brace 24. The rear tire brace 24 is spaced apart from the rearward portion 20a of the support surface 20 and apart from the support surface 20 itself. The front restraint 26 is removably secured to the forward portion 20b of the support surface 20 to limit movement of the spare tire 22.

To remove the spare tire, and possibly tool changing gear 84, the front restraint 26 is unsecured and removed from the support surface 20. In particular, threaded fastener 64 is removed from the apertures 66, 68 so that the front restraint 26 is disconnected from the support surface 20. With the front restraint 26 disconnected from the support surface 20, the spare tire 22 can be removed from the receiving channel 34 and the support surface 20. More particularly, a user can grasp the handle 72, which is connected to the bag 78 (or received within the bag 78 such that pulling of the handle 72 pulls the bag 78), to remove the bag and its contents (i.e., the tire 22 and the tool changing gear 84) from the auxiliary compartment or chamber 38 and then, if desired, out of the main compartment or chamber 36 through opening 42.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for storing a spare tire within a vehicle comprising:
    a support surface for supporting the spare tire, said support surface having a rearward portion on which a rearward radial portion of the spare tire is supported and a forward portion on which a forward radial portion of the spare tire is supported;
    a rear tire brace vertically spaced apart from said rearward portion of said support surface for limiting lifting movement of said rearward radial portion of the spare tire; and
    a front restraint member removably secured to said forward portion of said support surface for limiting at least one of forward, lateral and lifting of the spare tire relative to said support surface;
    wherein said rear tire brace extends in a contacting manner radially along an upper axial side of the rearward radial portion of the spare tire, a lower axial side of the spare tire resting against said support surface.

2. The system of claim 1 wherein the forward and rearward radial portions of the spare tire are generally diametrically opposed to one another with said rear tire brace engaging the rearward radial portion of the spare tire and said front restraint member engaging the forward radial portion of the spare tire.

3. The system of claim 1 further including a rear wall extending upward from said support surface along said rear radial portion of the spare tire.

4. The system of claim 3 wherein said support surface is generally horizontal and extends along a lower axial side of the spare tire, said rear wall extending upwardly from said support surface a distance greater than a thickness of the spare tire.

5. The system of claim 1 wherein said rear tire brace is generally wedge-shaped having a wider base closely adjacent said rear wall and a narrower apex portion spaced apart from said rear wall.

6. The system of claim 1 wherein said support surface is the floor of an auxiliary chamber of a two chamber storage compartment, a main chamber of said two chamber storage compartment forwardly disposed relative to said auxiliary chamber and having a main chamber floor disposed at a lower elevation than said support surface.

7. The system of claim 6 further including a non-movable ceiling wall disposed over said auxiliary chamber and an openable closure disposed over said main chamber for allowing the spare tire to be removed from said two chamber storage compartment when said front restraint member is removed.

8. The system of claim 7 wherein said ceiling wall and said openable closure form a bed floor of a load-carrying bed disposed in the vehicle and said two chamber storage compartment forms a trunk compartment in said bed floor of said load-carrying bed.

9. The system of claim 6 wherein said front restraint member prevents movement of the spare tire into said main chamber when removably secured to said forward portion of said support surface.

10. The system of claim 1 further including a flexible bag in which the spare tire is disposed, the spare tire movable in a forward transverse direction along said support surface by pulling said flexible bag when said front restraint is unsecured from said forward position of said support surface.

11. The system of claim 10 wherein said flexible bag is a net bag.

12. The system of claim 10 wherein said front restraint includes a handle, said front restraint connected to said flexible bag such that said handle is usable to pull said flexible bag when said front restraint is unsecured from said support surface.

13. The system of claim 12 wherein tire changing gear is disposed within said flexible bag and within a recessed well portion of the spare tire so that removal of said net bag and the spare tire also removes said tire changing gear.

14. The system of claim 1 wherein a tool storage unit is secured to the spare tire.

15. A retention system for storing and retaining a spare tire within a vehicle compartment comprising:
    a support surface of the vehicle compartment for supporting the spare tire;
    a rear tire brace spaced apart from said support surface, said rear tire brace protruding into the vehicle compartment to define a tire receiving channel between said support surface and said rear tire brace for receiving a rear radial portion of the spare tire; and
    a front restraint member removably mounted to said support surface at a location spaced apart from said rear tire brace along said support surface for limiting movement of the spare tire;
    wherein said rear tire brace is generally wedge-shaped so as to provide said tire receiving channel with a decreasing width along a depth thereof and wherein the spare tire contacts said rear tire brace in a storage position.

16. The retention system of claim 15 wherein the vehicle compartment includes a main chamber and an auxiliary chamber, said main chamber connected to said auxiliary chamber through an opening of sufficient size to pass the spare tire therethrough, said auxiliary chamber having a rear wall extending upwardly from said support surface, said rear tire brace mounted to and extending from said rear wall.

17. A method for storing a spare tire in a vehicle, comprising:
    positioning a spare tire on a vehicle compartment support surface with a rearward radial portion of the spare tire on a rearward portion of said support surface and a forward radial portion of the spare tire on a forward portion of said support surface;
    inserting the rearward radial portion of the spare tire into a receiving channel defined between said rearward portion of said support surface and a rear tire brace, such that the spare tire brace contacts the rearward radial portion of the spare tire, said rear tire brace spaced apart from said rearward portion of said support surface and apart from said support surface; and
    removably securing a front restraint to said forward portion of said support surface to limit movement of the spare tire.

18. The method of claim 17 further including:
    unsecuring and removing said front restraint from said support surface; and
    removing the spare tire from said receiving channel and said support surface.

* * * * *

UNITED STATES PATENT AND TRADEMARK OFFICE
CERTIFICATE OF CORRECTION

| | | |
|---|---|---|
| PATENT NO. | : 7,900,989 B2 | Page 1 of 1 |
| APPLICATION NO. | : 11/971208 | |
| DATED | : March 8, 2011 | |
| INVENTOR(S) | : David M. Edwards | |

It is certified that error appears in the above-identified patent and that said Letters Patent is hereby corrected as shown below:

Col. 7, line 1 of claim 5, please delete "1" and insert therefore --3--.

Signed and Sealed this

Seventeenth Day of May, 2011

David J. Kappos
*Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 7,900,989 B2 | |
| APPLICATION NO. | : 11/971208 | |
| DATED | : March 8, 2011 | |
| INVENTOR(S) | : David M. Edwards | |

It is certified that error appears in the above-identified patent and that said Letters Patent is hereby corrected as shown below:

Column 7, line 43 (Claim 5, line 1) please delete "1" and insert therefore --3--.

This certificate supersedes the Certificate of Correction issued May 17, 2011.

Signed and Sealed this
Twenty-first Day of June, 2011

David J. Kappos
*Director of the United States Patent and Trademark Office*